Aug. 8, 1950     A. J. WEATHERHEAD, JR., ET AL     2,517,745
DIAPHRAGM SEAL FOR PRESSURE RESPONSIVE DEVICES
Filed March 7, 1947
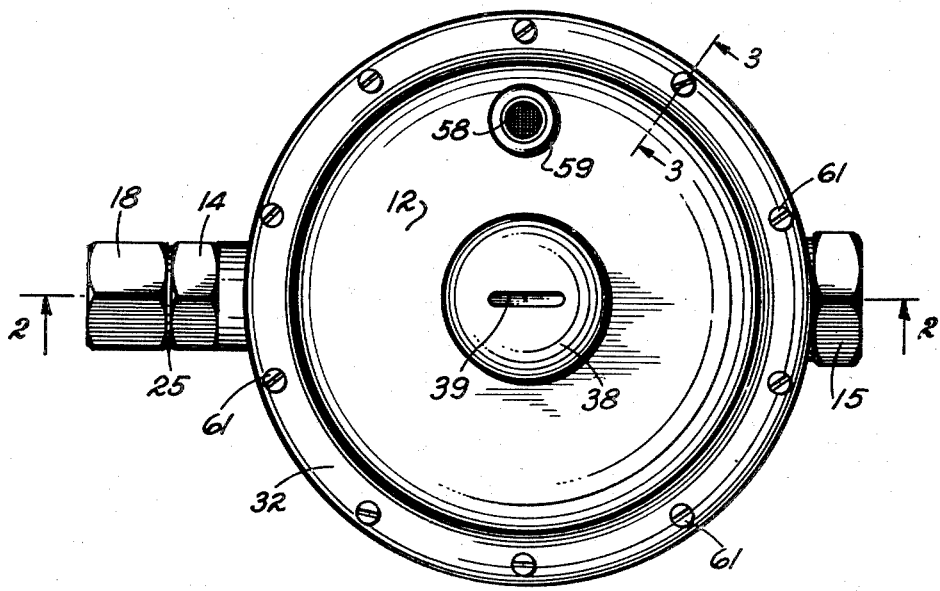
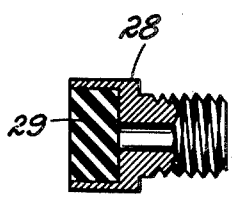
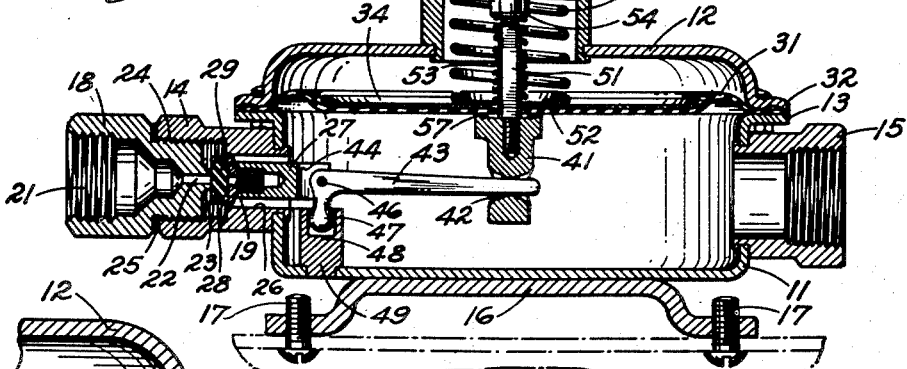
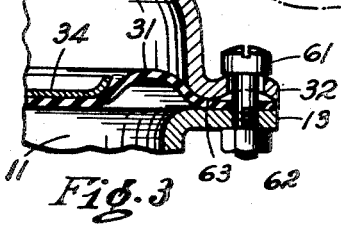
INVENTORS
ALBERT J. WEATHERHEAD, JR.
& JOSEPH NORMAN PAQUIN
BY Richey & Watts
ATTORNEYS Patented Aug. 8, 1950

2,517,745

UNITED STATES PATENT OFFICE 2,517,745

DIAPHRAGM SEAL FOR PRESSURE RESPONSIVE DEVICES

Albert J. Weatherhead, Jr., Cleveland, and Joseph N. Paquin, Euclid, Ohio, assignors to The Weatherhead Company, Cleveland, Ohio, a corporation of Ohio Application March 7, 1947, Serial No. 733,048

1 Claim. (Cl. 137—157)

This invention relates to pressure regulators. The preferred embodiment, illustrated herein, is a reducing valve especially adapted for use with high pressure cylinders of liquefied petroleum gas to reduce the pressure of the gas to a point suitable for use in gas burners. It has been the usual practice to cast or die cast the bodies and cover plates of valves of this type. This invention is directed to the fabrication of the valve casing from sheet metal stampings, certain fittings being copper brazed or projection welded to the casing. By virtue of the invention a regulator can be manufactured which is lighter and stronger than those with cast casings. An important feature of the invention lies in the conformation of the flange of the cover plate so as to secure a tight sealing engagement of the gasket between the regulator body and cover plate notwithstanding the relatively great inherent flexibility of a sheet metal construction as compared to a casting.

Other features of the invention reside in the provision of a simple and reliable regulator or valve mechanism.

An object of the invention is to provide a pressure regulator which is lighter in weight, stronger, and more durable and reliable than those known in the art.

Another object of the invention is to provide a stamped sheet metal casing for a pressure regulator or generally for containing fluid under pressure.

Another object is to provide a novel, simple, and efficient valve and operating mechanism therefor.

A further object is to provide a regulator which is economical to manufacture.

Other objects and advantages of the invention, more or less ancillary in nature, will be apparent to those skilled in the art from the description herein of the preferred embodiment of the invention.

Referring to the drawings:

Figure 1 is a plan view of a regulator;

Figure 2 is a vertical section taken on the plane indicated by the line 2—2 in Figure 1;

Figure 3 is a partial section taken on the plane indicated by the line 3—3 in Figure 1; and Figure 4 is a detail.

The parts of the regulator are contained in a housing consisting principally of a body 11 and a cover 12. The body is a sheet metal stamping, circular in plan and preferably V bottomed, and is formed with an outwardly extending flange 13 at its upper periphery. Turned inlet and outlet ports 14 and 15 are fixed in holes formed in the side walls of the body. These ports are preferably hydrogen brazed to the body to insure a leakproof construction. A mounting bracket 16 bent from a piece of strap iron and tapped for the reception of mounting screws 17 is welded to the bottom of the body 11.

The valve portion of the regulator is composed of an orifice insert 18 and a valve seat assembly 19. The orifice insert is formed with a central bore, tapped at 21 for the reception of the high pressure inlet pipe, which bore terminates in an orifice 22. A frusto-conical boss 23 defines a shoulder around the opening of the orifice 22. The insert is threaded for mounting in the tapped bore 24 of the inlet port 14, a gasket 25 compressed between the insert and the port sealing the interface. The valve seat assembly 19, which is mounted for reciprocation in a bore 26 in the inlet port, comprises a plunger 27 of square section, a valve seat disc retainer 28 preferably of hexagonal cross section screwed into the plunger, and a valve seat disc 29 of artificial rubber or comparable material cemented into the retainer. As stated, the valve seat assembly 19 is reciprocable in the bore 26 into engagement with the boss 23 of the orifice insert to throttle the flow of gas from the supply line into the body of the regulator. The non-circular cross-sections of the parts of the valve plunger provide for passage of gas past the assembly.

The valve plunger is actuated by the pressure of the gas on the low side of the valve acting on a flexible diaphragm 31 which is clamped between the flange 32 of the cover 12 and the flange 13 of the body. The diaphragm 31 is urged downward by a compression spring 33, the lower end of which engages a stiffening plate 34 and the upper end of which bears against an adjusting nut 35 threaded into a tapped sleeve 36 copper brazed into the center of the cover 12. Slots 37 in the upper face of the nut 35 provide for adjustment of the tension of the spring 33. A cover plug 38 formed with a screwdriver slot 39 and a gasket 40 close the upper end of the sleeve 36 and protect the adjusting nut. Movement of the diaphragm 31 is transmitted to the valve plunger 19 through a relief valve member 41 normally held against the under face of the diaphragm. The member 41 is formed with a transverse hole 42 countersunk from both ends, the central portion of the hole 42 closely engaging a lever arm 43 inserted therein. The lever arm 43 is part of a bellcrank lever mounted within a clevis formed by a slot 44 in the inner end of the valve plunger 27 and pivoted therein by a pin 46. The bellcrank lever also includes a depending arm 47 formed with a spherical lower extremity, which is inserted into a drilled hole 48 in a plug 49 copper brazed in an opening in the bottom of the body 11.

The relief valve member 41 is tapped at its upper end to receive the threaded lower end of a stud 51, the central portion of which is rectangular. The stud 51 passes through circular holes in the centers of the diaphragm 31, the plate 34, and a flanged washer 52, the latter serving to align the lower end of the spring 33. A compression spring 53 is retained between the washer 52 and a washer 54 held in place by a nut 56 adjustable on the threaded upper end of the stud 51. The spring 53 thus tends to retain the relief valve member 41 in engagement with the lower surface of the diaphragm 31. The upper surface of the member 41 is formed with an upwardly directed peripheral flange 57 which normally engages the under surface of the diaphragm 31 under the action of the spring 53, the force being adjustable by the nut 56. If the outlet of the regulator is blocked and leakage occurs through the valve the diaphragm 31 will be lifted. Since the movement of the valve member 41 is limited by the arm 43, excess pressure under the diaphragm will lift the diaphragm away from the member 41, permitting the gas to escape around the square stud 51 into the space above the diaphragm from which it is vented through a screen 58 (Fig. 1) mounted in a hollow plug 59 which is welded or otherwise secured to the cover 12. As will be seen in Figure 1, the orifice insert 18, inlet port 14, and outlet port 15 have hexagonal surfaces for the application of wrenches.

The cover 12 and body 11 are held together by bolts 61 and nuts 62 (Figs. 1 and 3) passing through holes in the flanges 32 and 13. The margin of the diaphragm 31 is held between the two flanges and serves as a gasket. In general, in this type of device, it has been customary to make the body and cover of heavy cast sections in order to secure sufficient rigidity to compress the gasket tightly enough to prevent leakage of gas. An important feature of the invention is the conformation of the flange 32 to provide perfect sealing although relatively thin and flexible material is used for the body and cover. This feature, as shown most clearly in Figure 3, consists simply in the upwardly convex form of the flange 32. While this conformation undoubtedly stiffens the flange slightly it is believed that the greatly improved sealing is due to the fact that the gasket is compressed in a narrow annulus beneath the rounded edge 63 of the flange rather than being compressed under the entire width of the flange, as would be the case with flat flanges. It has been found that it is necessary to form only one of the flanges convex, which supports the conclusion that the substantially line contact is the explanation of the beneficial results obtained.

The body 11 and cover 12 are preferably stamped from copper-bearing steel which has a high resistance to corrosion. The ends of the inlet and outlet ports and sleeve 36 which are fixed in the body and cover may be turned to a relatively small wall thickness and expanded within the body or cover to hold them in place mechanically before and during the copper brazing or projection welding operation.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed. Reference to welding in the claims is intended to be generic to welding, brazing, and equivalent operations.

We claim:

A pressure responsive device comprising a stamped cup-shaped body having a marginal flange, a stamped metal cover plate having a marginal flange mating said body flange, a diaphragm of rubber-like material with its marginal portion between the flanges, ports in the body, one of said marginal flanges being flat and the other being shallowly arched across its width and connected to its support by a reverse bend, and bolt means extending through the arched flange and the diaphragm and cooperating with the flat flange to locally compress said diaphragm at the free outer periphery of said arched flange and at the reversely bent inner periphery thereof, said arched flange being flattened somewhat within its elastic limit by tension of said bolt means so that cold flow of the diaphragm material from under its zones of compression is compensated for by re-arching of said arched flange.

ALBERT J. WEATHERHEAD, Jr.
JOSEPH N. PAQUIN.

REFERENCES CITED

The following references are of record in the file of this patent:

UNITED STATES PATENTS

| Number | Name | Date |
|---|---|---|
| 687,002 | Cash | Nov. 19, 1901 |
| 1,216,116 | Hayward | Feb. 13, 1917 |
| 1,641,628 | Fourness | Sept. 6, 1927 |
| 1,930,060 | Newman | Oct. 10, 1933 |
| 2,306,746 | Niesemann | Dec. 29, 1942 |
| 2,319,659 | Carnes | May 18, 1943 |
| 2,323,888 | Wright | July 13, 1943 |
| 2,399,115 | Hansen | Apr. 23, 1946 |